Aug. 2, 1949.　　　　　L. M. POTTS　　　　2,477,821
PHOTOELECTRIC MULTIPLEX SYSTEM
Filed Nov. 12, 1946　　　　　　　　　　9 Sheets-Sheet 1

INVENTOR
LOUIS M. POTTS, DECEASED
MARTHA W. C. POTTS, EXECUTRIX
BY Emery Robinson.
ATTORNEY Aug. 2, 1949.   L. M. POTTS   2,477,821
PHOTOELECTRIC MULTIPLEX SYSTEM
Filed Nov. 12, 1946   9 Sheets-Sheet 2

INVENTOR
LOUIS M. POTTS, DECEASED
MARTHA W. C. POTTS, EXECUTRIX
BY Emery Robinson
ATTORNEY

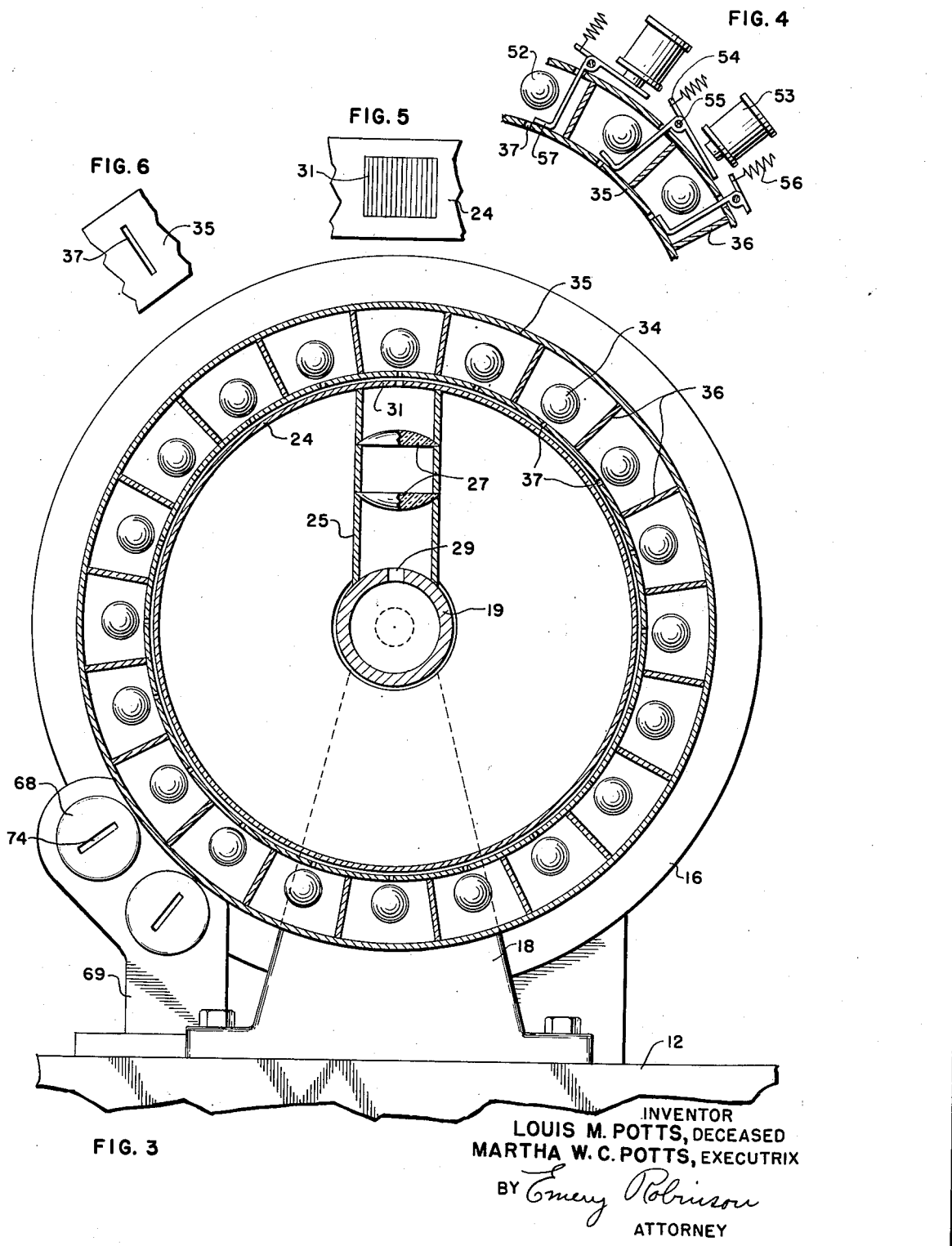

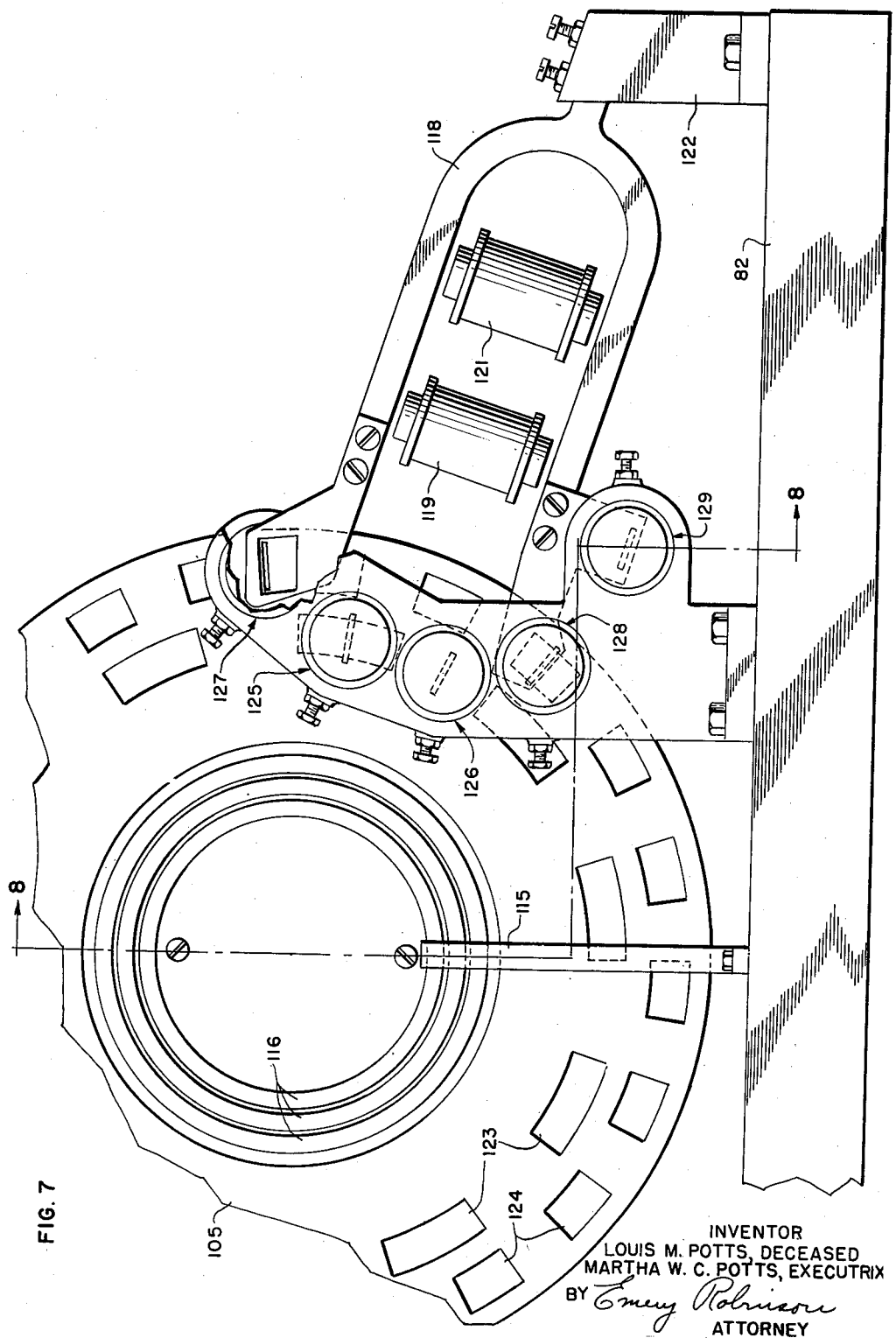

Aug. 2, 1949.　　　　　　　　L. M. POTTS　　　　　　　　2,477,821
PHOTOELECTRIC MULTIPLEX SYSTEM
Filed Nov. 12, 1946　　　　　　　　　　　　　　　　9 Sheets-Sheet 5

INVENTOR
LOUIS M. POTTS, DECEASED
MARTHA W. C. POTTS, EXECUTRIX
BY Emery Robinson
ATTORNEY Aug. 2, 1949.  L. M. POTTS  2,477,821
PHOTOELECTRIC MULTIPLEX SYSTEM
Filed Nov. 12, 1946  9 Sheets-Sheet 6

INVENTOR
LOUIS M. POTTS, DECEASED
MARTHA W. C. POTTS, EXECUTRIX
BY Emery Robinson
ATTORNEY Aug. 2, 1949.   L. M. POTTS   2,477,821
PHOTOELECTRIC MULTIPLEX SYSTEM
Filed Nov. 12, 1946   9 Sheets-Sheet 8

INVENTOR
LOUIS M. POTTS, DECEASED
MARTHA W. C. POTTS, EXECUTRIX
BY Emery Robinson
ATTORNEY Aug. 2, 1949.                    L. M. POTTS                    2,477,821
                          PHOTOELECTRIC MULTIPLEX SYSTEM
Filed Nov. 12, 1946                                         9 Sheets-Sheet 9
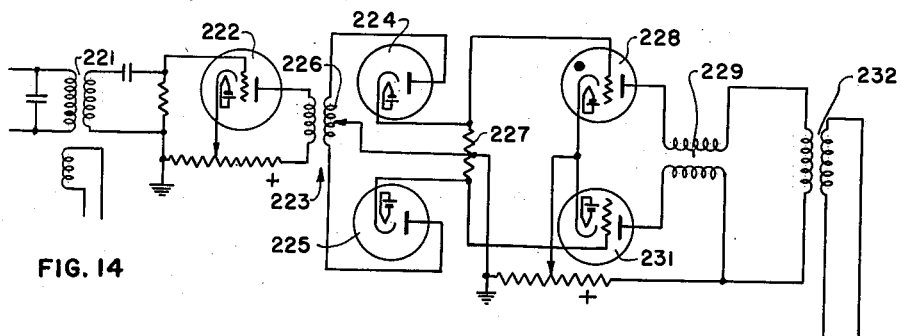
FIG. 14
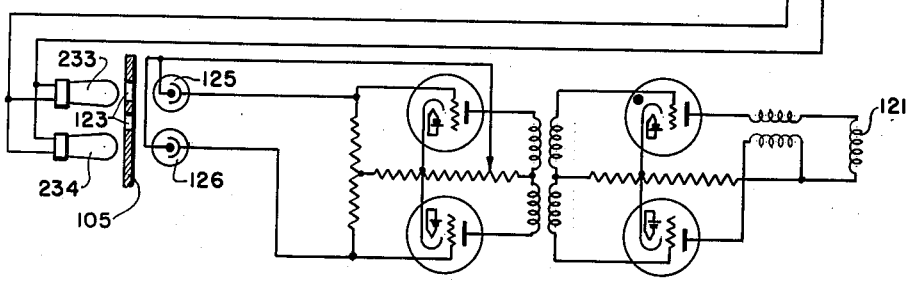
FIG. 15
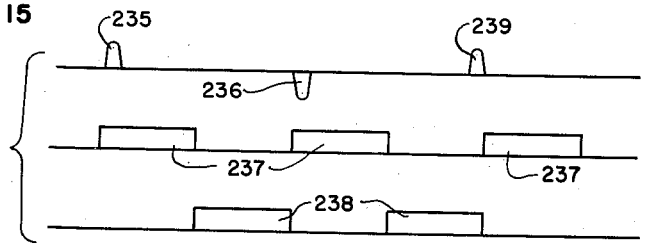
FIG. 16
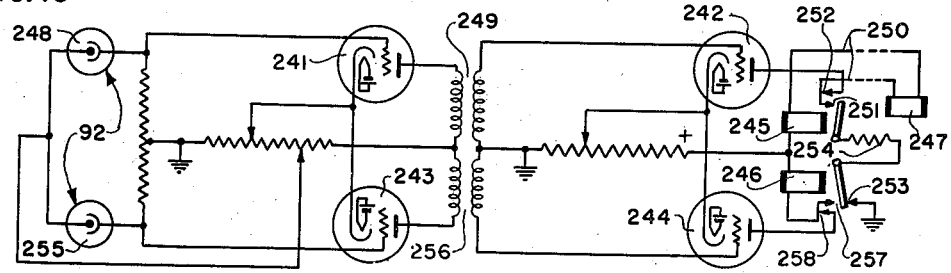
FIG. 17
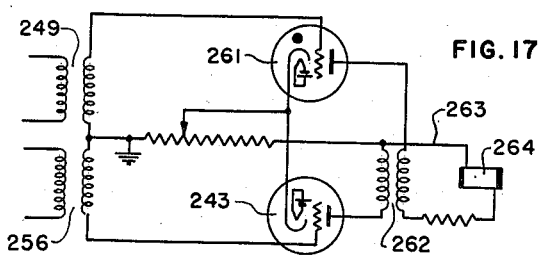
INVENTOR
LOUIS M. POTTS, DECEASED
MARTHA W. C. POTTS, EXECUTRIX
BY Emery Robinson
ATTORNEY Patented Aug. 2, 1949

2,477,821

UNITED STATES PATENT OFFICE 2,477,821

PHOTOELECTRIC MULTIPLEX SYSTEM

Louis M. Potts, deceased, late of Evanston, Ill., by Martha W. C. Potts, executrix, Evanston, Ill., assignor to Teletype Corporation, Chicago, Ill., a corporation of Delaware Application November 12, 1946, Serial No. 709,356

4 Claims. (Cl. 178—52)

This invention relates to telegraph systems and more particularly to a system in which the transmission and reception of signaling impulses are controlled photoelectrically.

The primary object of the invention is to control photoelectrically a distributed segment multiplex telegraph signaling system.

Another object of the invention is to provide a multiplex system in which a single photoelectric cell unit transmits the signal impulses of all the channels.

Another object of the invention is to provide a multiplex signaling system wherein the individual impulses of the different channels are so allocated that consecutive impulses always pertain to different channels.

A further object of the invention is to provide a multiplex signaling system of the photoelectric type wherein a single shutter device controls all the transmitting channels.

Specifically, the arrangement according to the present invention contemplates a transmitting device comprising a circular series of lamps arranged in a stationary frame, with one lamp associated with each channel or simplex line, so that in the arrangement exemplified in the following description twenty channels are contemplated. Mounted concentrically with relation to the series of lamps is a rotating scanner comprising a single photoelectric cell centrally located, and an optical system radiating therefrom so that the scanner is rotatable with the photoelectric cell as an axis to scan each channel consecutively. Each lamp is connected to a phasing start-stop repeater which in turn, is connected to a remotely situated start-stop transmitter so that as the start-stop transmitter is operated according to a permutation code, its associated lamp will flash correspondingly. The scanner makes one revolution per code impulse interval.

Carried by the scanner, is a disc member having scanning ports therein for the purpose of controlling the speed of rotation of the scanner. A tuning fork device is provided which cooperates with said disc to effect the speed control. The tuning fork driving circuit is also photoelectrically controlled, thus, the photoelectric output of the transmitting distributor is connected to the multiplex line by an amplifier. Another amplifier is provided at the receiving end of the line, and the output thereof is coupled to both a correcting circuit and to another amplifier and a detector controlling the receiving distributor. The receiving distributor comprises a circular series of photoelectric cells, and a glow lamp scanner rotatable concentrically thereof. In the rotatable scanner there is provided a pair of neon lamps, one for marking signals and one for spacing signals. Associated with the pair of lamps is an optical system which is also rotatable with the scanner for scanning and exciting or activating the photoelectric cells successively. Each of the photoelectric cells of the receiving distributor is connected to an outgoing channel. Furthermore, each of the outgoing channels from the receiving photoelectric distributor is connected to an extension arm circuit, which, in turn, extends to the receiving printer. The scanner and the receiving distributor is also provided with a disc having scanning ports therein for the purpose of cooperating with a tuning fork speed controlling device, similar to the arrangement provided at the transmitting distributor. However, the disc at the receiving distributor is provided with a second row of ports for cooperating with a correcting circuit arrangement.

A better understanding of the invention may be had from the following description taken in conjunction with the accompanying drawings, in which:

Fig. 3 is a sectional view taken substantially on lines 3—3 of Fig. 2;

Fig. 4 is a view illustrating a modified form of the light source;

Fig. 5 is a fragmentary view showing the conformation of the light port in the scanning cylinder;

Fig. 6 is a fragmentary view showing the conformation of the light port in the light tight cells;

Fig. 7 is a front elevational view, partly broken away of the photoelectric receiving distributor according to the present invention;

Fig. 14 is a corrector circuit;

Fig. 15 is a wave diagram of the received signals, and

Fig. 16 is a circuit diagram of the photoplex transmitting extension.

Fig. 17 is a modification of Fig. 16.

Figure 1:
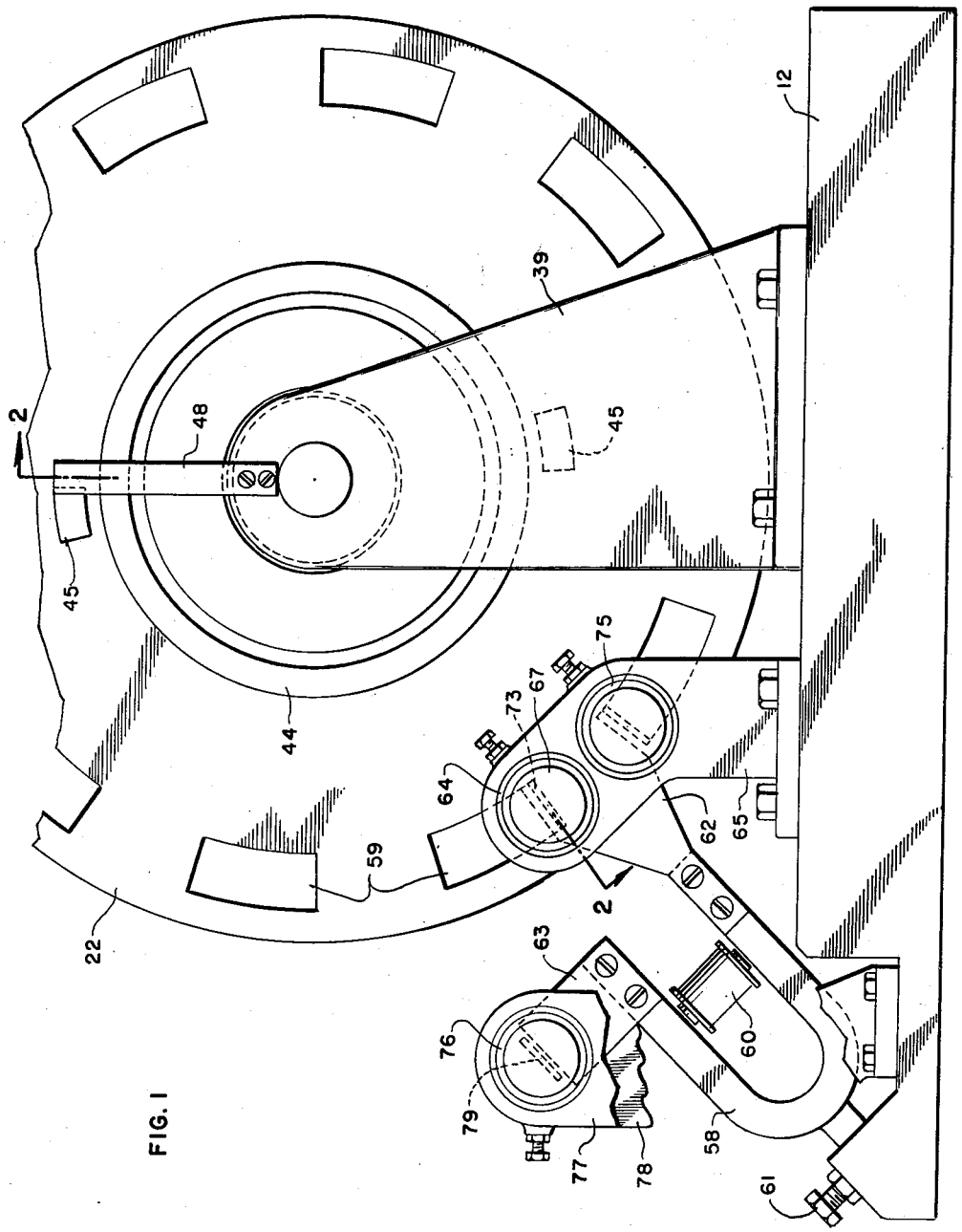
Fig. 1 is a front elevational view of the photoelectric transmitting distributor according to the present invention.
Figure 2:
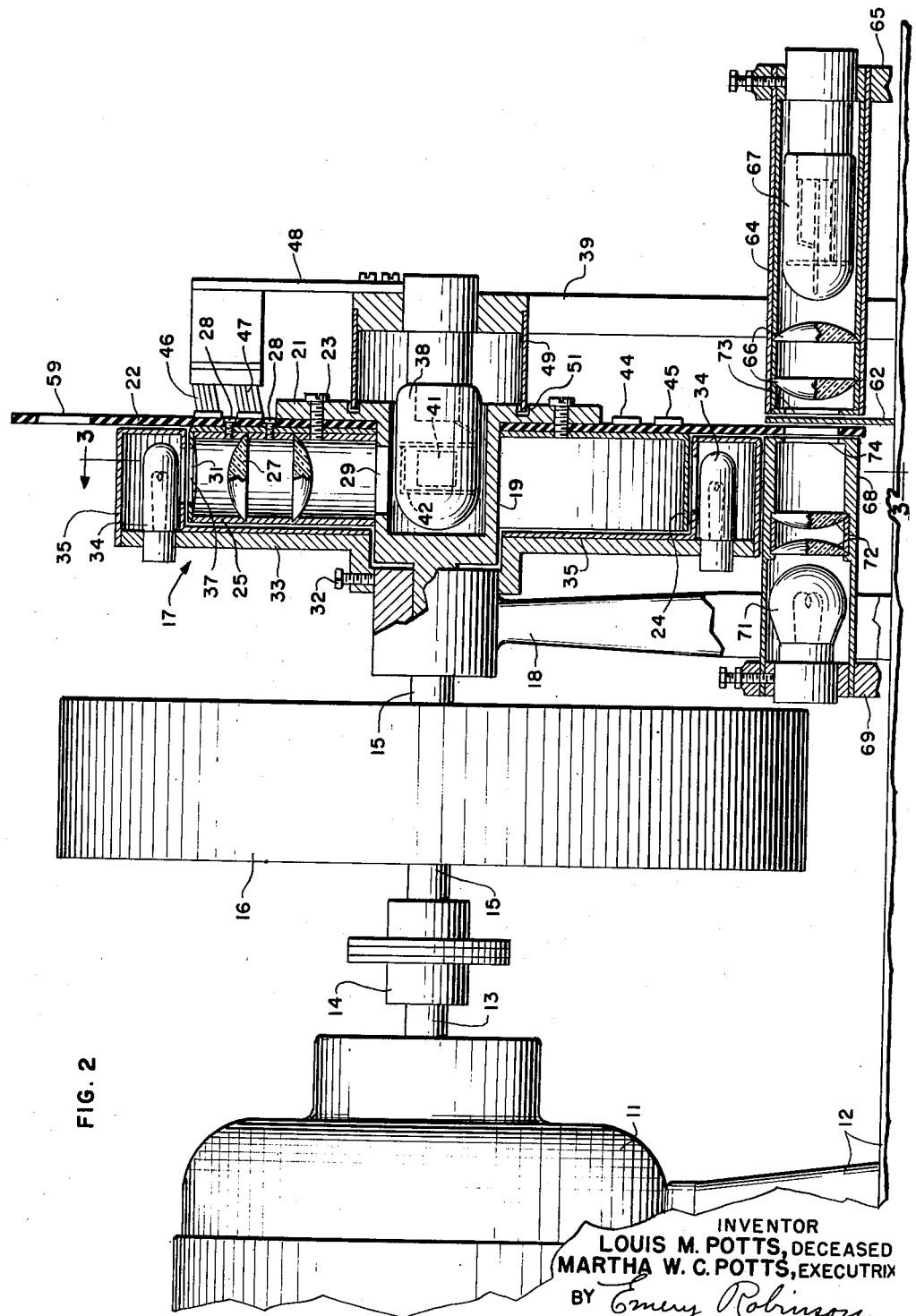
Fig. 2 is a cross sectional view taken substantially on lines 2—2 of Fig. 1.

Having reference to Figs. 1, 2, and 3, a motor 11 is mounted suitably upon a base portion 12. The motor shaft 13 is connected through a suitable drive connection 14 to a shaft 15 of the photoelectric scanning device. On shaft 15 is fixed a flywheel damper 16 of well known construction. The shaft 15 of the photoelectric scanning device 10 indicated generally at 17 is journaled in standard 18 mounted on the base 12 and terminates in a cup-shaped portion 19 provided with a flange 21 around its rim. A scanning disc 22 is secured to the flange 21 by means of screws 23 which also serve to secure a cylindrical portion 24. Within the portion 24 is mounted radially a lens housing 25 comprising a tubular portion suitably supporting a pair of lenses 27. Housing 25 is attached to the portion 24 by means of screws 23 and 28. Portion 19 is provided with a slot 29 coincident or in register with the lens housing 25. The lens housing 25 is provided with an aperture 31 in cylinder 24 having a screen thereover as illustrated in Fig. 5, composed of a plurality of alternate opaque and transparent portions which permits the light to pass through to the lenses 27.

Fixed to the standard 18 by means of a set screw 32 is a mounting plate 33 on which are carried a series of neon receiving lamps 34 located around the periphery of plate 33. The mounting plate has secured thereto a plate 35 which is conformed as shown in Fig. 2 to provide a housing for the lamps 34. As shown in Fig. 3, separating walls 36 are provided to enclose the lamps 34 in light tight cells. There being one lamp 34 for each of the twenty receiving channels provided in the present embodiment of the invention. Each of the light tight cells, containing a lamp 34, is provided with a slot 37 as shown in Fig. 6.

Positioned in the cupped portion 19 is a photoelectric cell 38 suitably mounted on a bracket 39 supported on the base 12. Thus, as the disc 22, carrying the lens housing 25, rotates, the screen 31 passes the slots 37 consecutively permitting light from the lamps 34 to successively pass through the lenses 27 to reach the photoelectric cell 38. The photoelectric cell 38 comprises a cylindrical cathode 41 which is photosensitive over its entire outer surface, and a suitable anode collector ring 42. The mounting for the lamp 34 and their housings are stationary. The disc 22, the lens housing 25 and the commutator segments 44 and 45 all rotate with the flywheel 16. As the assembly rotates, light from successive lamps strikes the periphery of the cylindrical cathode of the photoelectric cell 38.

As shown in Figs. 1 and 2, the disc 22 is provided with a pair of commutator rings comprising an inner solid or continuous ring 44 and an outer segmental ring 45, consisting in the present embodiment of four segments of substantially 90 degrees each. Cooperating with the commutator rings 44 and 45 are a pair of brushes 46 and 47 which are carried on a bracket 48 fixed to the standard 39. Therefore, with the present arrangement the brushes 46 and 47 are fixedly mounted while the commutator rings rotate. A light excluding cylinder 49 is carried on bracket 39 and is adapted to fit into a circular groove 51 in the flange 23.

A modification of the light source is shown in Fig. 4. In this form, the receiving element in each channel is composed of a continuously illuminated lamp 52, instead of the neon lamp 34 shown in the principal embodiment. Each channel is also provided with a magnet 53 having an armature 54 pivoted at 55. A spring 56 functions to bias the armature 54 clockwise (as viewed in Fig. 4) to cause its end 57 to cut off the light from lamp 52. Magnet 53 is the receiving magnet of one of the start-stop input circuits, and armature extension 57 controls the light through slot 37 in accordance with the received signals. The speed of the device is such that the screen 31 scans all of the slots 37 once for each code impulse.

A tuning fork 58 is supported in the base 12 at an appropriate angle to cooperate with a series of apertures 59 in the scanning disc 22, the tuning fork being clamped into position by means of a clamping screw 61. The tuning fork 58 carries on one of its tines a shutter 62 and on the other of its tines is carried a shutter 63. A magnet 60 is suitably positioned between the tines of the tuning fork 58 and controls the vibration of the fork in a well known manner. As shown in Figs. 1 and 2 the shutter 62 is adapted to oscillate or vibrate in front of the apertures 59 of the disc 22. Disposed in register with the apertures 59 and located on the right side of the shutter 62 (as viewed in Fig. 2) is a cylinder 64 carried in a bracket 65 mounted on the base 12. Within the cylinder 64 is housed a pair of lenses 66 and a photoelectric cell 67. In axial alignment with the cylinder 64 and disposed on the left side of the scanning disc 22 is a lamp housing 68 carried on a bracket 69 mounted on the base 12, and comprises a lamp 71 and a pair of lenses 72. The confronting ends of the housings 64 and 68 are provided with slots 73 and 74, respectively, positioned radially with respect to the center of the shutter disc 22 and in axial alignment with each other.

The brackets 65 and 69 also support a second pair of housings similar to the housings 64 and 68 which are also positioned in axial alignment with each other and in register with the shutter apertures 59. These housings are generally indicated at 75 (Fig. 1). Thus, the housings 64 and 75 are arranged in predetermined spaced relation on the bracket 65 so that the shutter 62 and the tine of the tuning fork 58 is adapted to operate therebetween in such a manner that in its normal position the shutter 62 overlaps the slot 73 and clears the slot in the housing 75. In this manner, when the tuning fork begins to vibrate and the shutter 62 begins to oscillate, the openings in the adjacent housings 64 and 75 will be alternately opened and closed (Fig. 1).

Cooperating with the shutter 63 is a photoelectric scanning arrangement comprising a photoelectric cell and an illuminating lamp similar to the arrangement previously described and shown in Fig. 2. This scanning arrangement indicated generally at 76 (Fig. 1) is carried on a bracket 77 and bracket 78; that is, the photoelectric cell is carried on the bracket 77 and the lamp is carried on bracket 78. The housings containing the photoelectric cell and the lamp are each provided with confronting slots 79 which are adapted to be opened and closed by the shutter or light chopper 63 in response to the vibrations of the tuning fork 58. The brackets 77 and 78 are suitably mounted on the base unit 12. The circuit employed in conjunction with this scanning arrangement will be described hereinafter.

Figure 8:
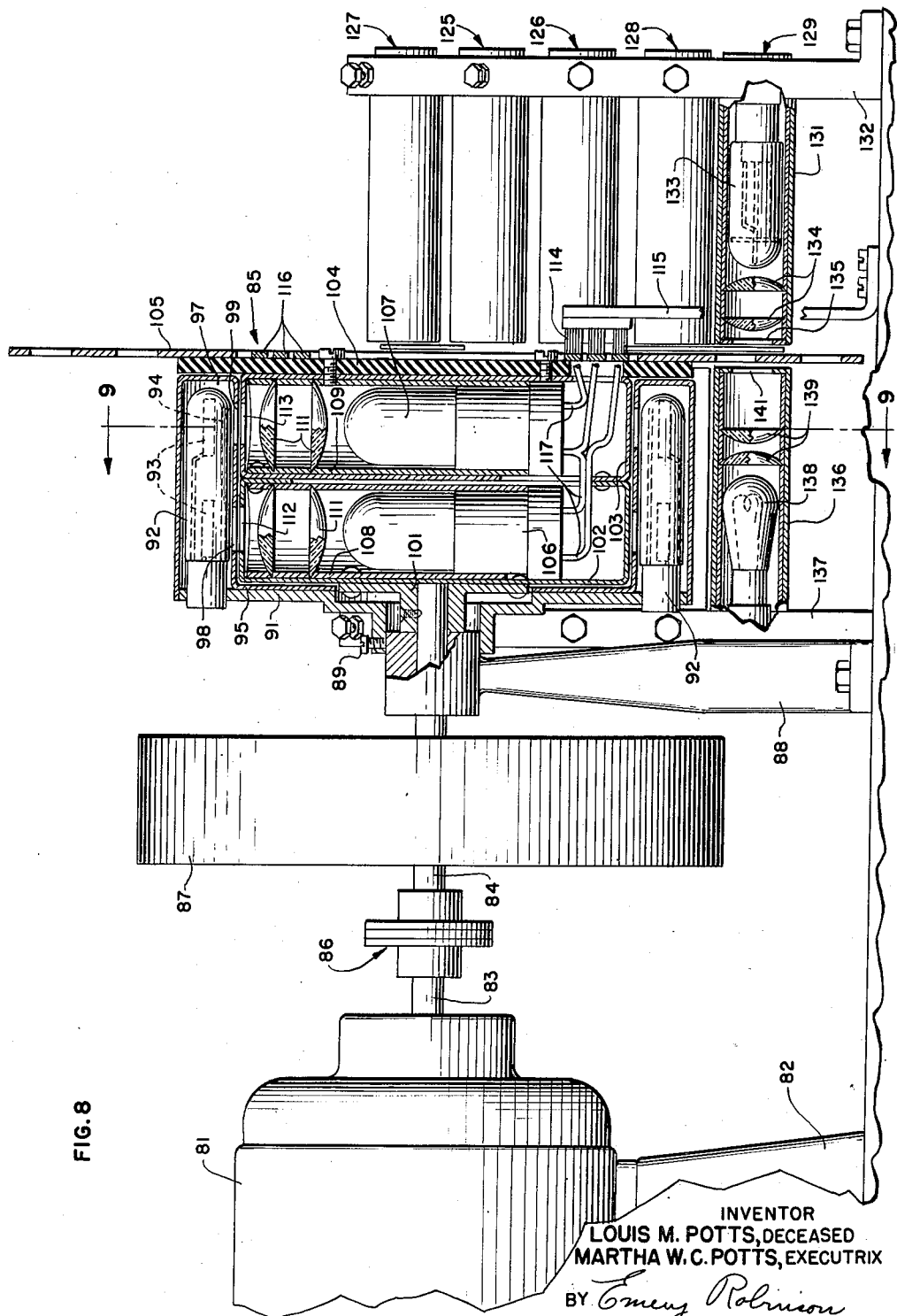
Fig. 8 is a cross sectional view taken substantially on lines 8—8 of Fig. 7.
Figure 9:
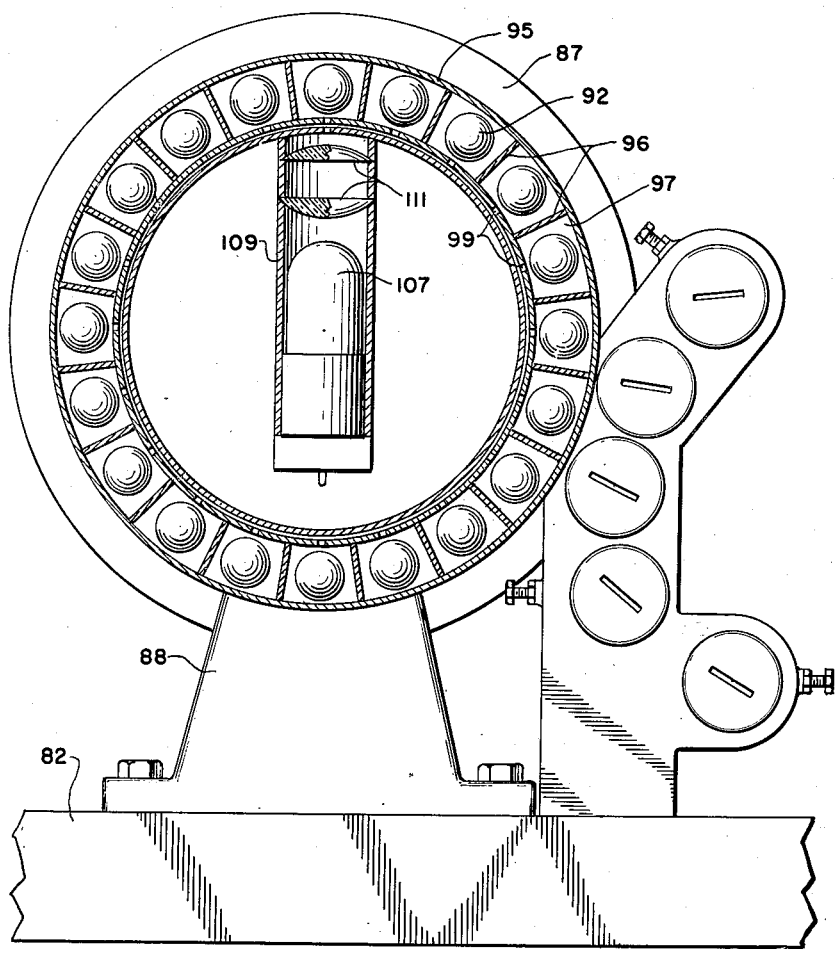
Fig. 9 is a sectional view taken on lines 9—9 of Fig. 8.

The photoelectric multiplex receiving arrangement according to the present invention is shown in Figs. 7, 8, and 9 and comprises a motor 81 suitably mounted on the base 82. The motor shaft 83 is connected to the shaft 84 of the scanning unit indicated generally as 85 through a suitable driving connection 86. A flywheel damper 87 of well known design is carried on the shaft 84 which is journaled in a standard 88 supported on the base 82. Shaft 84 is journaled in a bracket 88 mounted on the base 82. Secured to bracket 88 by means of a set screw 89 is a stationary photocell carrier member 91, supporting around its periphery a series of photoelectric cells 92. In the present embodiment of the invention twenty such cells are contemplated, to correspond to the twenty channels of the multiplex. The photoelectric cells 92 in the embodiment shown are twin photocells, wherein two cathodes 93 are supported in the same envelope and a single anode 94 is provided. However, two separate photocells may be used in place of the twin cells. These photocells 92, through amplifier circuits to be hereinafter described, control the signals on the respective simplex extensions from the multiplex. Fastened to the member 91 is a member 95 so conformed around its periphery as to produce with the members 91 and partitions 96 (Fig. 9), a plurality of lightproof compartments 97 for the photoelectric cell 92. Each compartment 97 is provided on its inside surface with a pair of longitudinally aligned light slits 98 and 99 (Figs. 8 and 9).

Fixed to the shaft 84 at the right-hand thereof (as viewed in Fig. 8) is a flanged member 101, to the flange of which is secured a cylindrical member 102. Secured to member 102 is a second cylindrical member 103. To the portion 103 is secured a disc 104 of insulating material to which, in turn, is secured a shutter disc 105. The assembly comprising the discs 104 and 105 and the members 103 and 102, and the flanged member 101 all securely united are rotatable with the shaft 84. Within the member 102 is mounted a glow lamp 106, and within the member 103 is mounted a glow lamp 107. The cylindrical housings 108 and 109 for the glow lamps 106 and 107, respectively, are each provided with a pair of lenses 111. The housings 108 and 109 are also provided with light slots 112 and 113 adapted to register with the slots 98 and 99, respectively. The rotary element mounted on the shaft 84 carries the glow lamps 106 and 107, one of which glows when spacing signals are received over a multiplex circuit, and the other glows when marking signals are received. As the glow lamps rotate light is distributed from these glow lamps through the lenses 111 to the slots 112 and 113, then through one of the slots 98 and 99 to a photoelectric cell 92 in accordance with the signals on the original input circuit of the multiplex. The multiplex input to the neon or glow lamp 106 and 107 is carried by a set of brushes 114 insulatably carried on a bracket 115 mounted on the base 82, and a corresponding series of segmented rings 116, insulatably mounted on the insulated disc 104. The lamps 106 and 107 are connected electrically by conductors 117 to the rings 116.

As previously described in connection with the transmitting portion of the present invention, the speed of the receiving device is also determined by a tuning fork 118, (Fig. 7) which is vibrated by a magnet 119 and corrected by a magnet 121 in a manner hereinafter to be described in connection with the electrical circuits. The receiving distributor, as in the case of the transmitting distributor, makes one revolution per element of the code signal.

The tuning fork 118 is mounted on a bracket 122 which, in turn, is carried on the base 82 and is disposed at an appropriate angle to cooperate with the series of apertures 123 and 124 in the shutter disc 105. As shown in Fig. 7, the apertures 123 and 124 are arranged in concentric rows close to the periphery of the disc 105. The row of apertures 123 cooperates with a pair of photoelectric scanning devices 125 and 126, and the outer row of apertures 124 cooperates with a pair of photoelectric scanning devices 127 and 128. A photoelectric scanning arrangement 129 is also provided for controlling the vibrating circuit of the tuning fork 118. Each of the scanning devices 125 to 129 comprises a housing 131 (Fig. 8) carried on a common bracket 132 mounted on the base 82. Within each of the housings 125 to 129 is carried a photoelectric cell 133 and a pair of lenses 134. Each of the housings 131 is provided at its free end adjacent the shutter 105 with a light controlling slot 135. The scanning devices 125 to 129 comprise also a housing 136 carried on a common bracket 137 mounted on the base 82. Within each housing 136 is mounted a light source in the form of an electric lamp 138 and a pair of lenses 139. The housing 136 also is provided at its free end with a light controlling slot 141 which is in register and coincides axially with the slot 135 in the housings 131.

Figure 10:
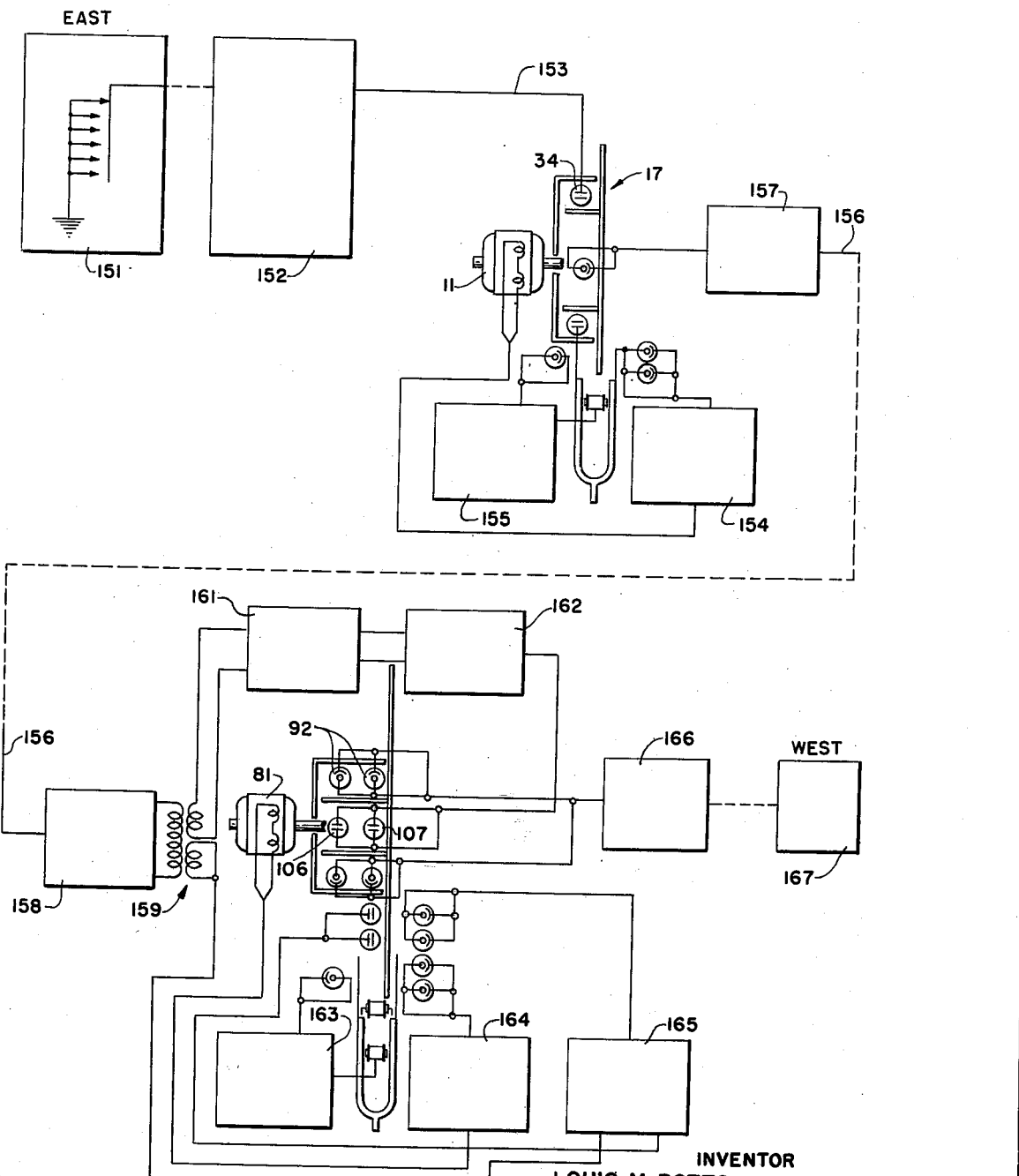
Fig. 10 is a schematic diagram of the photoplex system according to the present invention.

In Fig. 10 is shown a schematic circuit diagram illustrating the photoplex system according to the present invention. In this figure, transmission is assumed to extend from east to west. At east is shown a start-stop extension arm composed of a start-stop transmitter 151 and a phasing start-stop repeater 152.

The repeater 152 controls, over line 153, one of the lamps 34 of the photoelectric distributor 17. As previously stated the distributor 17 accommodates twenty channels, and therefore twenty such extension arms as exemplified by units 151 and 152 and line 153 are connected to the distributor 17, one line 153 for each lamp 34. Associated with the distributor 17 is a speed control circuit arrangement 154 and a tuning fork driving circuit arrangement 155. The photoelectric output of the distributor 17 is connected to the multiplex line 156 through an amplifier 157.

At the receiving end of the line, the input is connected through an amplifier 158 to a transformer 159. One of the divided outputs of the transformer 159 is connected through an amplifier 161 and a detector 162 to neon or glow lamps 106 and 107. At the receiving distributor there is provided a tuning fork driving circuit 163, a motor speed control circuit arrangement 164, and a correcting circuit arrangement 165, including their respective photoelectric elements. Each of the outgoing channels, of which there are twenty in the present embodiment, corresponding with the number of channels emanating from the transmitting distributor 17, is controlled by a pair of photoelectric cells, or twin photoelectric cells 92 in the receiving distributor 85. Only one channel is shown in Fig. 10 controlling an outgoing extension 166, and subsequently the west printer 167.

The various circuits for the photoelectric multiplex system according to the present invention will now be described.

Figure 11:
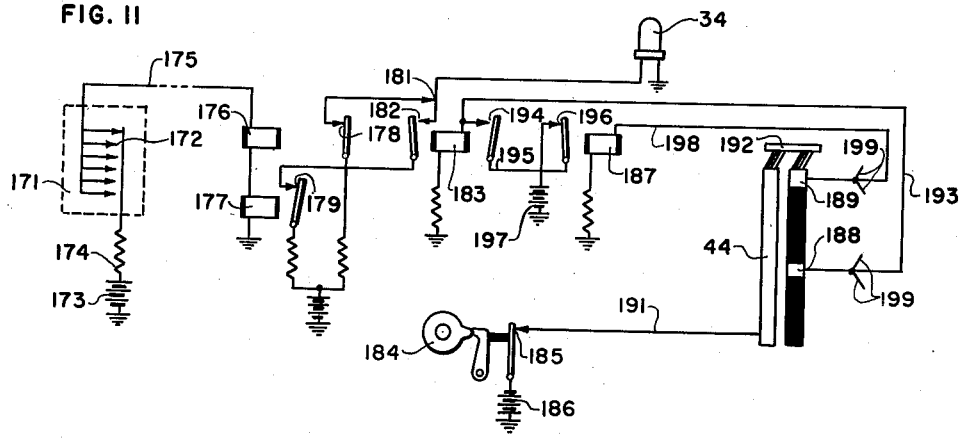
Fig. 11 is a circuit diagram of the start-stop extension arm.

Having reference to Fig. 11, there is shown an extension arm circuit for the photoplex system according to the present invention, which circuit is one of twenty such circuits associated with the distributor shown in Figs. 1 and 2 since the function of the extension arm circuit is to interconnect a simplex channel and a multiplex transmitting distributor in such a manner that the simplex signals will never be chopped by the multiplex regardless of their relative phase condition. The extension arm circuit in Fig. 11 comprises a simplex channel transmitter 171 including a set of start-stop transmitting contacts 172. The simplex line extends from battery 173, through resistance 174, through the transmitting contacts 172, over simplex line 175, through the winding of the regenerative repeater magnet 176, and through a repeating signal relay 177 to ground. According to the circuit shown, the incoming signals can be repeated by the regenerative repeater transmitter contact 178 with a delay of about one half a code unit, or by the relay repeating contacts 179 with no delay. The make-before-break contacts 181 and 182 of relay 183 permit switching of the circuit to the lamp 34 from one to the other of the two sets of repeating contacts 178 or 179. The lamp 34 is one of the series of lamps around the periphery of the transmitting distributor shown in Figs. 1 and 2.

The regenerative repeater exemplified by the magnet 176 is of the type shown in U. S. Patent No. 2,358,100, issued to L. M. Potts. In the repeater of this type, a cam 184 is mounted on the clutch sleeve of the regenerative repeater and holds a contact 185 closed normally in the stop position of the shaft. As soon as the cam 184 starts to rotate, the contact 185 opens and the connection to battery 186 is removed from the relays 183 and 187, as will presently appear. Circuits to the relays 183 and 187 are completed through segments 188 and 189, respectively, of the distributor shown in Fig. 1 comprising the solid inner ring 44 and the segmental outer ring. The circuit to the relay 183 extends from battery 186, through contact 185 (which is closed when the cam 184 is in the stop position as shown), then over connector 191, through solid segment 44, through the brush 192, through segment 188 (when brush 192 is in contact therewith), over connector 193, through the winding of relay 183, to ground. Relay 183, upon becoming energized, pulls up its armatures to close contact 182 and open contact 181 of the make-before-break contact, and also to close its contact 194 to complete a locking circuit for the relay 183 from ground, through the winding of relay 183, then through contact 194, over conductor 195, and through contact 196 (now closed), to battery 197.

The circuit for the relay 187 extends from battery 186, through contact 185, over conductor 191, through ring 44, then through brushes 192, through contact segment 189 (when the brushes are in contact therewith), then over conductor 198, through the winding of relay 187, to ground. When relay 187 becomes energized, it attracts the armature to open the contact 196, thereby breaking the locking circuit (if connection has previously been established) of the relay 183. Thus, when the repeater is at rest, the relays 183 and 187 will be alternately energized as the segments 188 and 189 are traversed by the brushes 192. However, as soon as a start impulse is received, the contact 185 will be opened and relay 183 will remain in its instant position, either energized or de-energized, until the signal being received is completed. When relay 183 is in its operated position, the signal will be repeated through the lamp 34 from contact 179 of relay 177; when relay 183 is in its unoperated or unenergized position, the signals will be repeated from the regenerative repeater contact 178.

The relative orientation of the segments 188 and 189, and the position of the lamps 34 about the periphery of the distributor is such that signals which would not be split by the distributor are repeated from relay 177; that is, such signals start the regenerative repeater through the brush making contact with segment 189. Signals which cause regenerative repeater operation through segment 188, some of which would be split, are transmitted at a delayed time by the action of the regenerative repeater. It is understood that the segments 188 and 189 serve for only a certain number of channels, and that other pairs of segments having a different location serve for other channels. Two pairs may be sufficient for all these channels. As previously mentioned, the distributor shown in Fig. 1 is capable of accommodating twenty different channels, one of which is shown in Fig. 1. The remaining simplex channels are exemplified by the short wires 199 in Fig. 11. Of course, instead of having the make-before-break contacts 181 and 182 control the lamp 34, they may instead control the magnet 53 in (Fig. 4).

Figure 12:
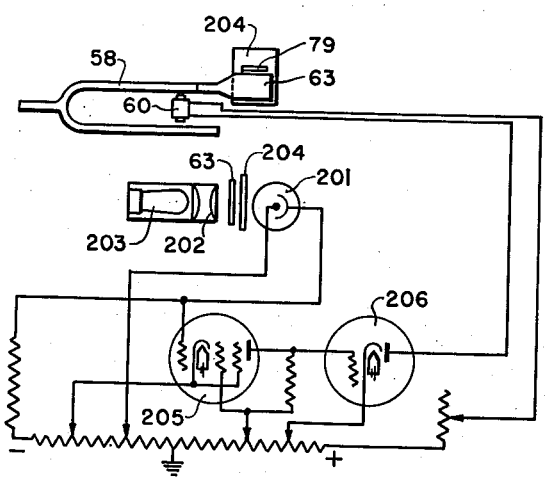
Fig. 12 is a tuning fork driving circuit.

The circuit shown in Fig. 12 is a photoelectric method of providing driving power for a fork, similar to the common operating circuit for a tuning fork having the usual vibrating contacts. The circuit arrangement is divided into three portions, namely, the general view of the fork with the driving magnet, the shutter arrangement, and the amplifier.

Tuning fork 58 vibrates the shutter or blade 63 to chop the light passing through the slit 79 in the fixed shutter 204, permitting light to pass about one-half of the time. Lamp 203 projects a beam of light against the slit 79 in the fixed shutter 204. The fork blade or shutter 63 lies between the fixed shutter 204 and the photoelectric cell 201. When the shutter 63 blocks light from passing through the slit 79, the photoelectric cell 201 is nonconductive and no current flows through the grid control circuit, and accordingly the grid of the tube 205 will be at a considerably negative potential to that of the cathode and very little or no current will flow in the plate circuit of the tube 206. In this condition, the potential of the grid of the tube 206 will be substantially that of the plate of tube 205 which can be adjusted to permit current to flow in the plate circuit of tube 206. This current will energize the magnet 60 and attract the tines of the fork 58 to the magnet. When the blade 63 thus unblocks the slit 79, light will pass through to the photocell 201 and the grid of the tube 205 will be made more positive and more plate current will therefore flow in the plate circuit of the tube 205, and accordingly the grid of the tube 206 will become negative thereby cutting off the current to the magnet 60 which will release the pull on the tines of the fork 58. Accordingly, as these alterations continue, the fork 58 will be forced to vibrate.

Figure 13:
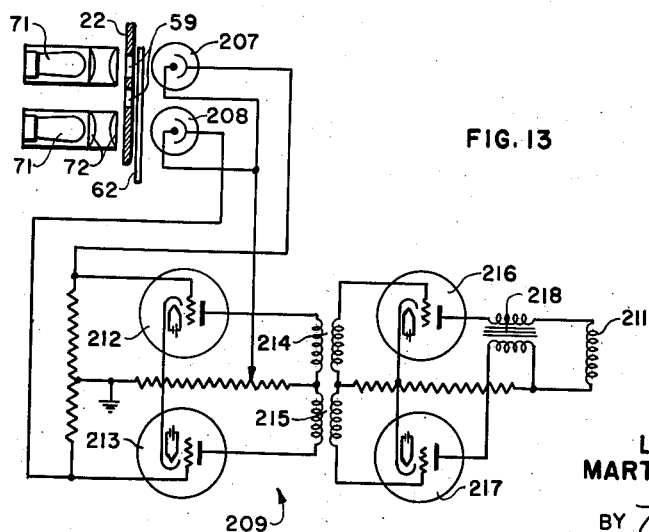
Fig. 13 is a synchronizing circuit.

In Fig. 13 is illustrated a synchronizing circuit which is composed primarily of a pair of photoelectric cells 207 and 208 exemplified by the cells 67 in Fig. 2; a photoelectric amplifier, indicated generally as 209, and a motor regulating field winding 211 for controlling the speed of the motor 11 (Fig. 2) for driving the multiplex distributor, to synchronize the distributor with the tuning fork 58. This circuit is provided for both the transmitting and receiving distributors. The photoelectric system is composed of filament lamps 71, rotating disc 22 bearing slots 59, tuning fork shutter 62 and photoelectric cells 207 and 208. The slots 59 are arranged around the disc 22 to alternately and equally illuminate the photoelectric cells 207 and 208 when considered independently of the tuning fork shutter 62. The shutter 62 on tuning fork 68 is arranged to alternately obstruct the light paths from the lamps when the fork vibrates. In one extreme synchronizing phase condition, the tuning fork shutter 62 will oscillate out of phase with the disc slot 59 and a full amount of light will pass from the lamps to the photoelectric cells 207 and 208. In the other extreme phase position shutter 62 will block the openings 59 and no light will ever reach the photoelectric cells 207 and 208. In an intermediate phase position, the light will be passed part of the time through each slot 59 in the disc 22, and as the phase varies, the vibration of the recurring flashes will vary to furnish proper control conditions for synchronizing.

When no light is falling on the photocells 207 and 208, the grids of tubes 212 and 213 are biased to cut off the plate current. The transformers 214 and 215 will be unexcited, the grids of tubes 216 and 217 will be likewise negative to cut off the respective plate current thereof, and little or no current will flow into the regulating field winding 211 of the motor 11. The motor 11 drives the rotating disc 22, which is to be synchronized, to the tuning fork 58 (Fig. 12). Thus, should light fall on photocell 207, the grid of tube 212 becomes somewhat positive, plate current will flow through tube 212 and transformer 214 will momentarily make the tube of the grid 216 more positive. Plate current will then flow through the tube 216 and since tube 216 is a gaseous type, plate current will continue to flow therethrough after the grid has returned to a more negative condition. Should light now fall on the photocell 208, the grid of the tube 213 will become more positive and, through transformer 215, cause the grid of tube 217 to become more positive. An impulse of plate current will thus flow through the transformer 218. Connections of transformer 219 are such that a responsive voltage surge in the secondary will be in the direction to cut off the plate current from the gas tube 216 and current will be cut off from the winding 211.

At the instances when no light falls on the photoelectric cells, no current flows in the connecting field winding 211; at other times when light falls on the photocells, current flows in the field winding 211. When the machine is operating in synchronism with the vibrations of the fork 58, intervals of current and no-current will follow one another at a frequency corresponding to the number of openings 59 in disc 22 and the frequency of fork 58. In one extreme phase position of the fork 58 and the rotating disc 22 the intervals of no-current will be reduced to substantially zero, and in another extreme phase position, the intervals of current will be reduced to substantially zero. When all adjustments are correct and the disc is operating in synchronism, the intervals of current and no-current will be substantially equal. Variations tending to change the speed will be compensated for by a slight shift in the phase and a corresponding change in the relative length of the intervals of current and no-current. This synchronizing action is the integral effect of a plurality of impulses; the shift does not follow impulse by impulse but compensates very slowly for changes. Due to the large inertia of the rotating parts, changes must be slow compared to the frequency of the tuning fork.

In Fig. 14 is illustrated the correcting circuit, the function of which is to control the speed and phase of the receiving distributor tuning fork; and hence, adjust the receiving distributor to synchronize with the transmitting distributor. The circuit is composed of an amplifier for the multiplex line signal, and flashing lights controlled by the line signals, a photoelectric system controlled by the flashing lights, and an amplifier for controlling the speed of the tuning fork from the photoelectric system.

Having reference to Fig. 14, a transformer 221 is provided for coupling the first amplifier to the multiplex line circuit. A detector tube 222 is coupled by a transformer 223 to a pair of diode electronic tubes 224 and 225. The diodes 224 and 225 are connected in push pull to the secondary of the transformer 223 so that one-half wave of an alternating signal will produce current through diode 224, and the other half wave will produce current through the diode 225. On one polarity of the wave the current will flow from the cathode to the plate of the diode 224, then to the secondary 226, to the resistor 227 and back to the cathode of the tube 224. On the other polarity similar circuits may be traced from the electronic tube or diode 225, and it will be found that the currents flow in the opposite direction through the resistor 227. Resistor 227 is center tapped to ground and current pulses therein control the bias to gas triodes 228 and 231. Plate current will flow in either 228 or 231 once the corresponding control grid has been made sufficiently positive, until the potential is removed from the plate circuit or the plate circuit is broken. Transformer 229 is connected between the plate circuits of the tubes 228 and 231 so that the plate current in tube 231 will be in a direction to cut off the plate current of tube 228.

The multiplex line signals are square envelopes of a modulating frequency, the envelope reducing to zero current for spacing signals. The detector tube 222 delivers a corresponding square wave to the transformer 223, and the wave front will generate a short pulse in secondary 226 of a polarity to pass current through the tube 224. The current through the tube 224 will ignite the tube 228 and current will flow through the primaries of the transformers 229 and 232. When a spacing signal causes current to flow from tube 231 through the secondary of transformer 229, the winding connections are such that the plate potential on tube 228 is momentarily reduced below the sustaining voltage and current ceases to flow through tube 228.

Thus there flows from the tube 228 and in the primary circuit of transformer 232 a unidirectional current with a square wave shape. With both the rise and fall of the current in the primary in the transformer 232, there will be induced short voltage impulses in the secondary. While these voltages are of opposite polarity for the rise and fall, the glow lamps 233 and 234 (exemplified by lamp 138 in Fig. 8) are such that they will glow regardless of the polarity, and both of the glow lamps 233 and 234 light up momentarily with each change in the polarity of the received multiplex signal of transformer 221.

The photoelectric correcting system comprises photoelectric cells 125 and 126 cooperating with glow lamps 233 and 234 respectively through slots 123 in the shutter disc 105. Slots 123 are arranged to alternately and equally permit light from the glow lamps 233 and 234 to strike the cathodes of the respective photoelectric cells 125 and 126. There is an opening 123 and an equal opaque portion corresponding to each unit time interval of the signals. Each reversal of the signals produces a flash which will be permitted to pass through an opening 123 to impinge upon the cathode of one or the other photoelectric cell 125 or 126.

In Fig. 15 there is represented at 235 and 236 light generating impulses in the glow lamps 233 and 234. At 237 is represented in square waves the time in which the light may be permitted to pass through a slot 123 to photoelectric cell 125, and at 238 are square waves the time in which light may be permitted to pass through the photoelectric cell to 126.

The circuit for the control of the magnet 121, which is the correcting magnet of the tuning fork 118 (Fig. 7), from the photoelectric cell is identical to that of the control of the regulating field winding as shown for the synchronizing circuit in Fig. 13. In this case, light flowing on the photoelectric cell 125 will cause current to flow in the magnet 121, and this condition corresponds to the light impulses 235 and 236 which are shown in alignment with the square waves 237. With a slight increase in speed of the receiving distributor as from an increased fork rate due to an energized magnet, the light impulses will move forward in phase lightly, a condition shown at 239 (Fig. 15) where the light impulse is opposite one of the square waves 238. This would cause light to fall on the photoelectric cell 126 and cut off the current to magnet 121, and the speed would again drop. With proper synchronization these light impulses will be evenly split between the two conditions and maintain a very accurate synchronization, as very slight deviations will cause compensating corrections. Magnet 121 may be moved to a position with its pole pieces opposite the tine ends of the tuning fork 118, as is conventional with multiplex correcting systems.

In Fig. 16 is shown the photoplex transmitting extension which accepts the photoelectric output of a single channel of the photoplex receiving unit shown in Figs. 7 and 8 and converts this output into signals suitable for transmission over an extension arm to operate the receiving magnet of a start-stop sending telegraph equipment indicated 167 in Fig. 10. In Fig. 16, the photoelectric element 92 corresponds to the twin photoelectric cells of the same numeric shown in Fig. 8. Electronic tubes 241 and 242 are the two amplifiers for the marking signals, and electronic tubes 243 and 244 are the two amplifiers for the spacing signal. Relays 245 and 246 are the retransmitting relays, and the receiving relay 247 is a part of the selector for the printing equipment 167 shown in Fig. 10.

When light falls on the half of the photoelectric cell 92 designated 248 in Fig. 16, the grid of the tube 241 is made positive and the plate current flows in the primary of the transformer 249. According to the embodiment of the invention shown in Figs. 1 and 2, the signals transmitted over the multiplex circuit consists of an audio frequency for marking signals and no-current for spacing signals. The light then falling on the portion 248 of the photoelectric tube 92 consists of a series of impulses at an audio frequency and the current flowing in the primary of the transformer 249 will be a unidirectional oscillating current.

The grid of tube 242 is normally biased to cut off. When the first wave of a marking envelope is received by the primary of transformer 249, a positive voltage is developed in the secondary that will overcome the normal bias and plate current will flow. This current will flow over line 250 to the receiving magnet 247, through relay 245, to positive battery. When relay 245 operates it pulls up its armature to close its contact 251 and open its contact 252 of the make-before-break contact thereby cutting off the battery from the tube 242 and grounding the line at relay 246 through the contact 253 thereof, through the compensating resistor 254, maintaining the flow of the line current. When a succeeding or spacing impulse of light falls on the photocell portion 255 of the double photocell 92, it will be repeated by the tube 243 and transmitted through transformer 256 to the tube 244. The plate current from the tube 244 will flow through the relay 246 through the make-before-break contacts comprising the make contact 257 and the break contact 258. The plate circuit through the tube 244 is completed through the contact 258, then to the winding of relay 246 to battery or source of current. The relay 246 becoming energized pulls up its armature to open contact 253, close the make contact 257 and open the break contact 258. In this manner, the relay 246 is energized only momentarily, since upon being energized it opens its contacts 258 and the circuit for the relay 246 is broken. However, the opening of the contact 253 momentarily opens the line circuit for the receiving magnet 247, which line circuit 250 includes the relay 245. Accordingly, upon the opening of the line circuit, the relay 245 is de-energized to prepare the energizing of plate circuit for the tube 242. The line circuit will thereafter remain open until a marking impulse of light falls on the portion 248 of the dual photoelectric tube 92.

In Fig. 17 there is shown a variation of the circuit shown in Fig. 16, in which the tube 242 is replaced by a gas tube 261, and the relays 245 and 246 are replaced by the transformer 262. In the modification shown in Fig. 17, any impulse received from the transformer 249 will start conduction in the gas tube 261 (normally biased to cut off) and current will flow over the line 263 to the receiving relay 264 (comparable to relay 247), until a subsequent (spacing) impulse flows from the vacuum tube 243. Connections of transformer 262 are such that the resulting plate current of the tube 243 will oppose the plate current from tube 261 and extinguish conduction from that tube, cutting off the line current on the line 263. Thus, when the light shifts from the element 248 to the element 255 of the twin tube 92 the current in the receiving magnet 264 will change from a marking to a spacing condition and vice versa.

What is claimed is:

1. In a photoelectric signaling system, a plurality of simplex transmitting circuits, each comprising a start-stop distributor, a photoelectric multiplex transmitting distributor comprising a stationary circular series of lamps, one for each of said circuits, a start-stop extension arm interconnected between each simplex circuit and one of said lamps, a double regenerative repeater in each extension arm, a rotatable scanning device including a photoelectric cell adapted to scan each of said lamps consecutively, instrumentalities in said extension arm and said multiplex distributor cooperative with said repeater to insure the reception of unmutilated signals by said lamps regardless of the relative phase condition of said simplex and multiplex distributors, a photoelectric multiplex receiving distributor comprising a stationary circular series of twin photoelectric cells, one for each of said circuits, a rotatable scanning device including a pair of glow lamps adapted to scan each of said twin cells consecutively, means for maintaining said distributors in synchronism, and a plurality of photoelectrically governed receiving circuits, one associated to each of said twin photoelectric cells.

2. In a photoelectric signaling system, a plurality of incoming channels, a start-stop distributor in each channel, a double regenerative repeater in each channel, a multi-channel transmitting distributor comprising a stationary circular series of lamps, one for each incoming channel, a photoelectric scanning device cyclically rotatable to scan each of said lamps consecutively once per signal impulse interval, instrumentalities in said channels and said distributor cooperative with said repeater to insure the reception of unmutilated signals by said lamps regardless of the relative phase condition of said start-stop and said transmitting distributors, a multi-channel receiving distributor comprising a stationary circular series of twin photoelectric cells, one for each of said circuits, scanning means comprising a pair of glow lamps, said scanning means rotatable cyclically to scan each of said twin cells consecutively once per signal impulse interval, means for maintaining said distributors in synchronism, and a plurality of outgoing channels, one associated with each of said twin photoelectric cells.

3. A photoelectric communication system, a plurality of extension lines, each comprising a start-stop distributor, a common distributor in which said extension lines terminate comprising a series of light related elements and a scanning device, said elements and scanning device relatively movable with respect to each other at the speed of impulsing for scanning all elements during an impulse interval, a double regenerative repeater in each extension line, instrumentalities in said extension lines and said common distributor cooperative with said repeater to insure the reception of unmutilated signals by said light related elements regardless of the relative phase condition of said start-stop and said common distributors, a receiving distributor, a single channel signal line connecting said distributors, said receiving distributor comprising a corresponding series of light related instrumentalities and a scanning device, means for maintaining synchronism between said transmitting and said receiving distributors, and a plurality of outgoing channels, one associated with each of said receiving instrumentalities.

4. In a photoelectric communication system, a plurality of extension lines, each comprising a start-stop distributor, a common distributor in which said extension lines terminate comprising a series of light related elements and a scanning device, said elements and scanning device relatively movable with respect to each other at the speed of impulsing for scanning all elements during an impulse interval, a double regenerative repeater in each extension line, instrumentalities in said extension lines and said common distributor cooperative with said repeater to insure the reception of unmutilated signals by said light related elements irrespective of the relative phase condition of said start-stop and said common distributors, a receiving distributor, a signal line interconnecting said distributors, said receiving distributor comprising a corresponding series of light related instrumentalities and a scanning device, means associated with each distributor comprising a phasing disc and photoelectric devices for maintaining synchronism between said distributors, and a plurality of extension lines, one associated with each of said instrumentalities.

MARTHA W. C. POTTS,
*Executrix under the last will and testament of Louis M. Potts, deceased.*

REFERENCES CITED

The following references are of record in the file of this patent:

UNITED STATES PATENTS

| Number | Name | Date |
|---|---|---|
| 1,805,390 | Clark | May 12, 1931 |
| 1,919,888 | Hough | July 25, 1933 |
| 2,052,539 | Frischnecht | Aug. 25, 1936 |
| 2,105,016 | Smith | Jan. 11, 1938 |